(12) United States Patent
Nakanishi

(10) Patent No.: US 11,035,492 B2
(45) Date of Patent: Jun. 15, 2021

(54) REFLUX VALVE

(71) Applicant: Nidec Tosok Corporation, Zama (JP)

(72) Inventor: Tomohiko Nakanishi, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 16/776,625

(22) Filed: Jan. 30, 2020

(65) Prior Publication Data
US 2020/0300378 A1    Sep. 24, 2020

(30) Foreign Application Priority Data
Mar. 20, 2019 (JP) .............................. JP2019-053483

(51) Int. Cl.
*F16K 31/12* (2006.01)
*F01M 13/02* (2006.01)

(52) U.S. Cl.
CPC ............ *F16K 31/12* (2013.01); *F01M 13/021* (2013.01)

(58) Field of Classification Search
CPC ... F16K 31/12; F01M 13/021; F01M 13/0011
See application file for complete search history.

(56) References Cited

U.S. PATENT DOCUMENTS

| | | | | |
|---|---|---|---|---|
| 2,633,147 A | * | 3/1953 | Badami | F16K 17/30 137/506 |
| 4,168,721 A | * | 9/1979 | Mueller, Jr. | G05D 16/02 137/514.7 |
| 4,552,172 A | * | 11/1985 | Krieger | F16K 47/00 137/484.6 |
| 6,352,085 B1 | * | 3/2002 | Morita | F01M 1/20 137/516.27 |
| 9,410,457 B2 | * | 8/2016 | Fujiki | F01M 13/0011 |
| 9,587,751 B2 | * | 3/2017 | Yamada | F16K 15/026 |
| 9,790,827 B2 | * | 10/2017 | Yamada | F01M 13/0011 |
| 2018/0051606 A1 | | 2/2018 | Muramatsu | |

FOREIGN PATENT DOCUMENTS

JP     2018-028285 A    2/2018

* cited by examiner

*Primary Examiner* — Eric Keasel
(74) *Attorney, Agent, or Firm* — Keating & Bennett

(57) ABSTRACT

A reflux valve includes a first supported portion that plugs a first opening when a valve body biased by a biasing member moves to one side in an axial direction, the first supported portion opens the first opening when the valve body moves to the other side in the axial direction against a biasing force of the biasing member due to negative pressure applied to a downstream side relative to an upstream side, the valve body includes a first hole extending from an end on the other side in the axial direction to one side in the axial direction, a valve body portion includes a second hole extending from an outer side in a radial direction and reaching the first hole, and the valve body portion includes a third hole at a different position from the second hole in the axial direction.

19 Claims, 11 Drawing Sheets

REFLUX VALVE

CROSS REFERENCE TO RELATED APPLICATION

The present invention claims priority under 35 U.S.C. § 119 to Japanese Application No. 2019-053483 filed on Mar. 20, 2019, the entire contents of which are hereby incorporated herein by reference.

1. FIELD OF THE INVENTION

The present disclosure relates to a reflux valve.

2. BACKGROUND

A reflux valve that causes blowby gas to reflux to an intake side in an internal combustion engine is known in the related art. A reflux valve of this type is called a positive crankcase ventilation (PCV) valve and is disposed on a blowby gas passage connecting the crankcase and the intake side (e.g., an intake manifold). The PCV valve causes blowby gas generated in the crankcase to reflux to the intake side by opening the intake side (the entrance side of the blowby gas that has passed through the PCV valve to a combustion chamber) using negative pressure.

Japanese Unexamined Patent Application Publication No. 2018-28285 discloses an attachment structure of a PCV valve for resolving a freeze inside the PCV valve with heat of blowby gas. In the PCV valve described in Japanese Unexamined Patent Application Publication No. 2018-28285, the columnar valve body is accommodated in the cylindrical valve case, and blowby gas refluxes from openings provided between the inner circumference of the valve case and the outer circumference of the valve body.

It is preferable in an internal combustion engine to promote active reflux of blowby gas to deal with, for example, regulations on car exhaust gas. However, in a PCV valve of the related art like the PCV valve disclosed in Japanese Unexamined Patent Application Publication No. 2018-28285, although a flow rate for causing blowby gas to reflux increases according to increasing negative pressure on the intake side, a flow rate for causing blowby gas to reflux is low in a situation in which negative pressure on the intake side is small. In Japanese Unexamined Patent Application Publication No. 2018-28285, in order to increase a flow rate for causing blowby gas to reflux in such a situation in which negative pressure on the intake side is small, increasing the opening area between the inner circumference of the valve case and the outer circumference of the valve body is conceivable, but because a diameter of the flow path needs to be widened in order to increase the opening area in this way, the entire PCV valve becomes larger, which restricts a layout of the engine.

SUMMARY

Example embodiments of the present disclosure provide reflux valves that can each cause a large amount of blowby gas to actively reflux in a situation in which negative pressure on an entrance side is small, without increasing a size of the reflux valve.

An example embodiment of the present disclosure is a reflux valve that is disposed on a blowby gas passage to allow blowby gas of an internal combustion engine to reflux to an intake side, the reflux valve including a housing that includes a tube including a through hole penetrating the tube in a direction parallel or substantially parallel to a central axis, a valve body that is movable inside the through hole in an axial direction, and a biasing member that biases the valve body to one side in the axial direction, the tube includes a first opening that is open to one side of the through hole in the axial direction and connected to the blowby gas passage on an upstream side, a second opening that is open to the other side of the through hole in the axial direction and connected to the blowby gas passage on a downstream side, a first support portion that supports the valve body on one side of the through hole in the axial direction, a second support portion that supports the valve body on the other side of the through hole in the axial direction, and a tube body that is provided on the other side of the first support portion in the axial direction and one side of the second support portion in the axial direction, the valve body includes a first supported portion that is supported by the first support portion, a second supported portion that is supported by the second support portion, and a valve body portion that is provided on the other side of the first supported portion in the axial direction and one side of the second supported portion in the axial direction, the first supported portion plugs the first opening when the valve body biased by the biasing member moves to one side in the axial direction, the first supported portion opens the first opening when the valve body moves to the other side in the axial direction against a biasing force of the biasing member due to negative pressure applied to the downstream side relative to the upstream side, the valve body includes a first hole extending from an end on the other side in the axial direction to one side in the axial direction, the valve body portion includes a second hole extending from an outer side in the radial direction and reaching the first hole, and the valve body portion includes a third hole at a different position from the second hole in the axial direction.

The above and other elements, features, steps, characteristics and advantages of the present disclosure will become more apparent from the following detailed description of the example embodiments with reference to the attached drawings.

DETAILED DESCRIPTION

Figure 1:
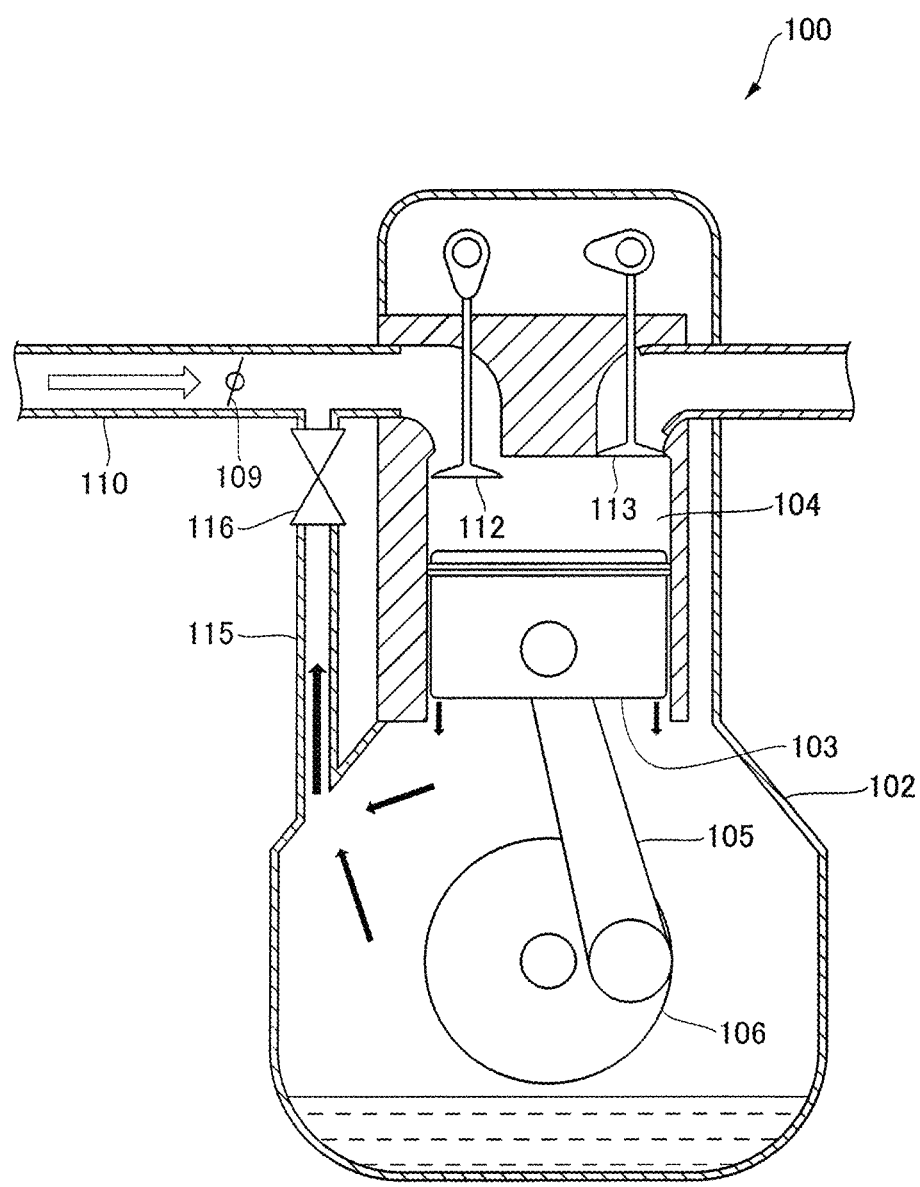
FIG. 1 is a schematic configuration diagram illustrating a configuration of an internal combustion engine to which a reflux valve according to a first example embodiment of the present disclosure is applied.

PCV valves according to example embodiments of the present disclosure will be described below with reference to the drawings. In addition, in order to make each structure easily understandable, scales, numbers, and the like of the structures in the following drawings may differ from those of actual structures.

In addition, in the drawings, an XYZ coordinate system is appropriately shown as a three-dimensional Cartesian coordinate system. In the XYZ coordinate system, the Z axis direction is a direction parallel to the central axis J illustrated in FIG. 2. The X axis direction is a direction in which the section of the sectional diagram illustrated in FIG. 2 expands, and is orthogonal to the Z axis direction. The Y axis direction is a direction orthogonal to the Z axis direction and the X axis direction. In all of the X axis direction, the Y axis direction, the Z axis direction, a side toward which an arrow indicated in the drawing is directed is indicated as a + side and the side opposite thereto is indicated as a − side.

In addition, in the following description, a positive side of the Z axis direction (+Z side) will be referred to as a "rear side" and a negative side of the Z axis direction (−Z side) will be referred to as a "front side." Further, the rear side and the front side are merely designations for the description and do not limit actual positional relationships and directions. In addition, unless specified otherwise, a direction parallel to the central axis J (the Z axis direction) will be referred to simply as an "axial direction," a radial direction from the central axis J will be referred to simply as a "radial direction," and a circumferential direction around the central axis J, that is, a direction around the central axis J (θ direction), will be referred to simply as a "circumferential direction."

Further, in the present specification, extension in the axial direction includes extension in a direction tilting from the axial direction at an angle in the range of less than 45° in addition to extension in the exact axial direction (the Z axis direction). In addition, in the present specification, extension in the radial direction includes extension in a direction tilting from the radial direction at an angle in the range of less than 45° in addition to extension in the exact radial direction, that is, a direction perpendicular to the axial direction (the Z axis direction).

First Example Embodiment

<Overall Configuration>

FIG. 1 is a schematic configuration diagram illustrating a configuration of an internal combustion engine to which a PCV valve according to a first example embodiment of the present disclosure is applied. The internal combustion engine 100 is a multi-cylinder engine having a plurality of sets of pistons 103 and cylinders accommodating the pistons 103. The cylinders are provided above a crankcase 102 and include the pistons 103. In FIG. 1, only one cylinder and one piston 103 are illustrated for the sake of convenience. The piston 103 moves inside the cylinder in the longitudinal direction of the cylinder. A connecting rod 105 connected to the piston 103 rotates a crankshaft 106 according to the movement of the piston. A combustion chamber 104 is disposed above the piston 103. A spark plug for igniting fuel is provided in the combustion chamber 104.

An intake valve 112 is provided in an intake port of the combustion chamber 104. An exhaust valve 113 is provided in an exhaust port of the combustion chamber 104. Both the intake valve 112 and the exhaust valve 113 are valves that are opened and closed by a variable valve timing (VVT) mechanism.

An intake passage 110 is connected to the intake port of the combustion chamber 104. A throttle valve 109 is disposed inside the intake passage 110. Fresh air taken into the intake passage 110 is taken into the combustion chamber 104 via the throttle valve 109 and the intake valve 112 in order. The gas previously taken into the combustion chamber 104 is mixed with fuel injected from the injector in the intake passage 110. The fresh air and the fuel introduced into the combustion chamber 104 are ignited by the spark plug. The fuel combusted by this ignition increases the volume by vaporization and moves the piston 103 away from the spark plug.

The gas generated from the combustion of the fuel in the combustion chamber 104 is discharged from the exhaust port of the combustion chamber 104 to the outside via the exhaust valve 113 and an exhaust passage as exhaust gas.

The internal combustion engine 100 includes a blowby gas passage 115 connecting the crankcase 102 to a region of the throttle valve 109 of the intake passage 110 on a downstream side. A PCV valve 116 is provided on the blowby gas passage 115. The PCV valve 116 opens and closes using a difference between an inner pressure of the intake passage 110 and an inner pressure of the crankcase 102 and causes blowby gas inside the crankcase 102 to reflux to the intake passage 110.

<Configuration of PCV Valve 116>

Figure 2:
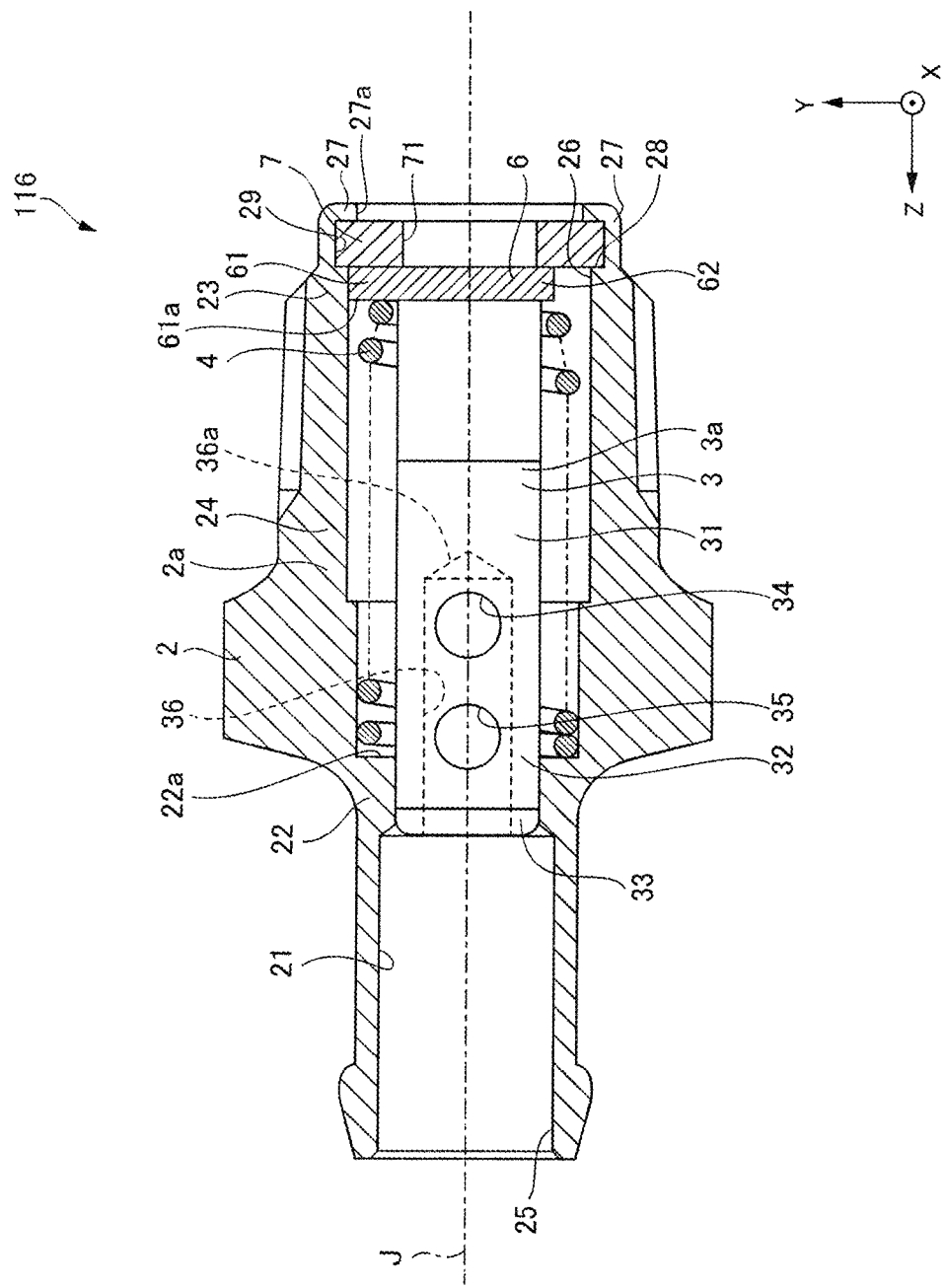
FIG. 2 is a side sectional diagram of a PCV valve 116 according to the first example embodiment of the present disclosure.
Figure 3:
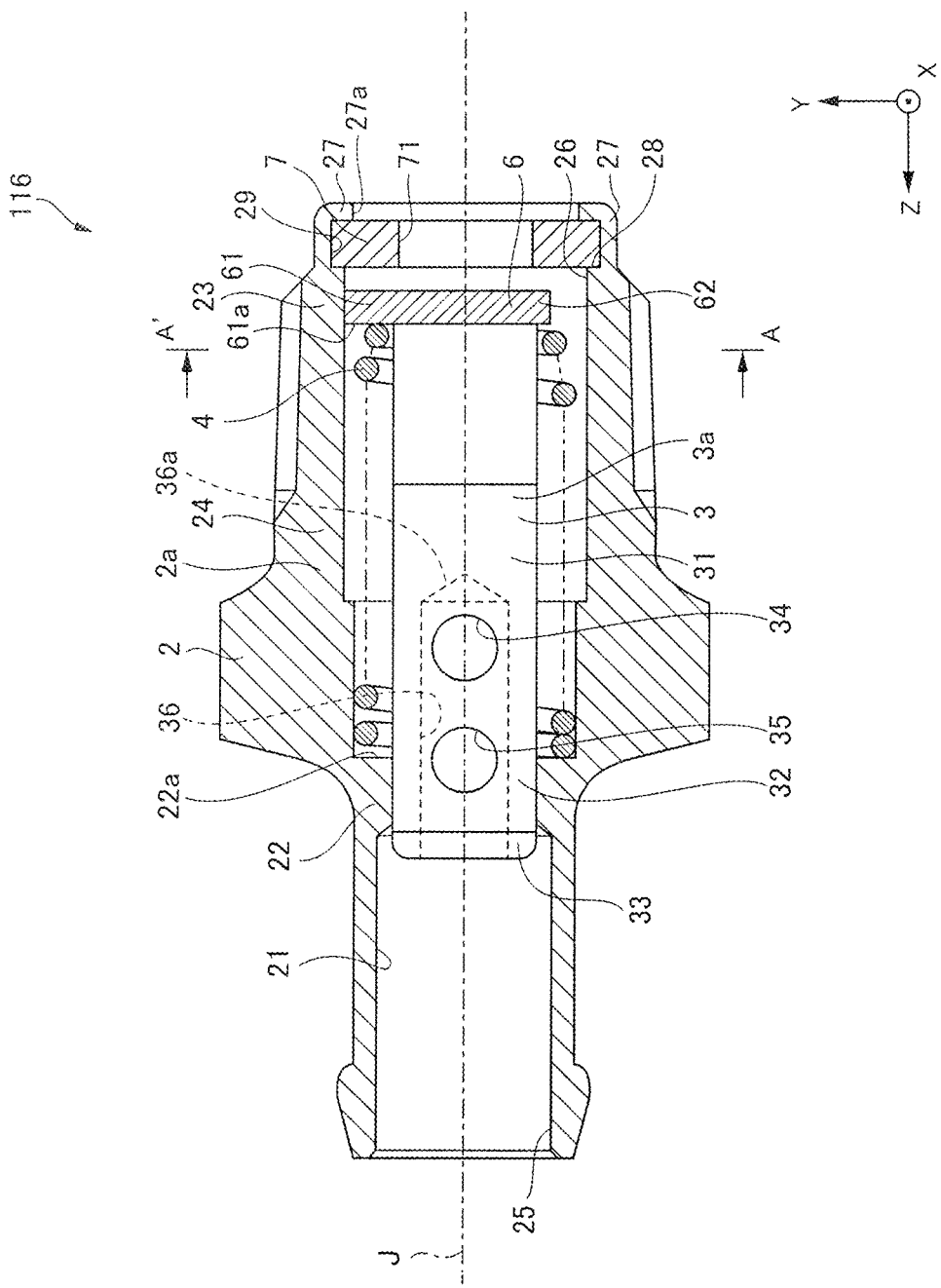
FIG. 3 is a side sectional diagram of the PCV valve 116 according to the first example embodiment of the present disclosure.

The PCV valve 116 according to the first example embodiment of the present disclosure will be described below. FIG. 2 and FIG. 3 are side sectional diagrams of the PCV valve 116 according to the first example embodiment of the present disclosure. FIG. 2 is a diagram illustrating a closed state of the PCV valve 116. FIG. 3 is a diagram illustrating an open state of the PCV valve 116. The PCV valve 116 has a housing 2 having a tube 2a with a through hole 21 penetrating the tube in a direction parallel to the central axis J, a valve body 3 that can move inside the through hole 21 in the axial direction, and biasing members 4 that bias the valve body 3 to one side thereof in the axial direction (−Z side).

<Housing 2>

The tube 2a of the housing 2 has a first opening 71 that is open to one side of the through hole 21 in the axial direction and connected to the blowby gas passage 115 on an upstream side (the crankcase 102 side). The tube 2a of the housing 2 has a second opening 25 that is open to the other side of the through hole 21 in the axial direction (+Z side) and connected to the blowby gas passage on a downstream side (the intake passage 110 side). The tube 2a of the housing 2 has a first support part 23 supporting the valve body 3 on one side of the through hole 21 in the axial direction. The first support part 23 supports the valve body 3 on an inner circumferential surface thereof. The tube 2a of the housing 2 has a second support part 22 supporting the valve body 3 on the other side of the through hole 21 in the axial direction. The second support part 22 supports the valve body 3 on an inner circumferential surface thereof. The tube 2a of the housing 2 has a tube body part 24 that is provided on the other side of the first support part 23 in the axial direction and one side of the second support part 22 in the axial direction. An inner circumference of the second support part 22 has a smaller diameter than an inner circumference of the tube body part 24. The second support part 22 has a second step surface 22a extending inward in the radial direction and facing one side in the axial direction on the boundary with the tube body part 24. The tube 2a of the housing 2 has an end 27 at one side in the axial direction. An inner circumferential surface 29 of the end 27 has a larger diameter than an inner circumferential surface 26 of the tube body part 24. The tube body part 24 has a step surface 28 extending inward in the radial direction and facing one side in the axial direction on the boundary with the end 27.

<Valve Seat Member 7>

The housing 2 has a valve seat member 7. The valve seat member 7 is an annular-shaped member. An inner circumference of the valve seat member 7 has a smaller diameter than an outer circumference of a flange member 6. The inner circumference of the valve seat member 7 forms the first opening 71. An outer circumference of the valve seat member 7 has a larger diameter than the inner circumferential surface 26 of the tube body part 24. The valve seat member 7 is accommodated on an inner side of the end 27 in the radial direction. The valve seat member 7 accommodated in the end 27 has a surface facing the other side in the axial direction that comes in contact with the step surface 28. The end 27 has a tip at the one side in the axial direction bending inward in the radial direction with the valve seat member 7 accommodated therein. The valve seat member 7 accommodated in the end 27 has a surface facing one side in the axial direction coming in contact with the tip, which bends inward in the radial direction, on the one side of the end 27 in the axial direction. An inner circumference of the tip, which bends inward in the radial direction, on the one side of the end 27 in the radial direction forms an opening 27a. The inner circumference of the tip, which bends inward in the radial direction, on the one side of the end 27 in the axial direction has a larger diameter than the inner circumference of the valve seat member 7. The inner circumference of the tip, which bends inward in the radial direction, on the one side of the end 27 in the axial direction has a smaller diameter than the outer circumference of the valve seat member 7.

<Valve Body 3>

The valve body 3 has a cylindrical member 3a and the flange member 6. In the present example embodiment, the cylindrical member 3a is a separate member from the flange member 6. Since the members are separate, each of the members can be produced without complex processing, and thus the manufacturing process can be simplified. The cylindrical member 3a may be the same member as the flange member 6. The flange member 6 is a first supported part supported by the first support part 23. The cylindrical member 3a has a valve body part 31 provided on the other side of the flange member 6 in the axial direction. The cylindrical member 3a has a second supported part 32 provided on the other side of the valve body part 31 in the axial direction.

The flange member 6 is press-fitted and fixed to the end on one side of the valve body part 31 in the axial direction. The shape of the flange member 6 viewed in the axial direction will be described below with reference to FIG. 4. The flange member 6 has a first step surface 61a extending outward in the radial direction and facing the other side in the axial direction on the boundary with the valve body part 31.

<Biasing Member>

In the present example embodiment, the biasing member 4 is a coil spring. The biasing member 4 may be a member other than a coil spring, for example, a leaf spring. An end on one side of the biasing member 4 in the axial direction comes in contact with the first step surface 61a. An end on the other side of the biasing member 4 in the axial direction comes in contact with the second step surface 22a. The biasing member 4 is accommodated in the space between the inner circumference of the tube body part 24 and an outer circumference of the valve body part 31. The flange member 6 moves to the one side in the axial direction by receiving a biasing force of the biasing member 4 on the first step surface 61a, and thereby plugs the first opening 71 (see FIG. 2). Accordingly, the valve body 3, which serves as a valve, plugs the first opening 71 of the valve seat member 7, which serves as a valve seat, and thus the PCV valve 116 closes. The flange member 6 moves to the other side in the axial direction against the biasing force of the biasing member 4 due to negative pressure applied to the second opening 25 side relative to the first opening 71 side (see FIG. 3). Accordingly, the valve body 3, which serves as a valve, opens the first opening 71 of the valve seat member 7, which serves as a valve seat, and thus the PCV valve 116 opens.

<Cylindrical Member 3a>

The cylindrical member 3a has a first hole 36 extending from the end on the other side in the axial direction to one side in the axial direction. The cylindrical member 3a has a second hole 35 extending from an outer side in the radial direction (an outer circumferential surface of the cylindrical member 3a) and reaching the first hole 36. The cylindrical member 3a has a third hole 34 extending from an outer side in the radial direction (an outer circumferential surface of the cylindrical member 3a) and reaching the first hole 36. In the present example embodiment, the cylindrical member 3a is coaxial with the central axis J. In the present example embodiment, the first hole 36 is coaxial with the central axis J. The direction in which the first hole 36 extends is a direction parallel to the axial direction. Since the first hole 36 is parallel to the axial direction, the cylindrical member 3a can be more easily processed in comparison to other cases. A bottom 36a that is an end on one side of the first hole 36 in the axial direction has a conical shape in which a depth of the first hole 36 becomes deeper inward in the radial direction.

A cross-sectional shape of the second hole 35 is a circular shape. Since the cross-section of the second hole 35 has a circular shape, the cylindrical member 3a can be more easily processed in comparison to other cases. In addition, since the second hole 35 has a circular shape on the outer circumferential surface of the cylindrical member 3a, it is possible to make an end of the second step surface 22a on an inner side in the radial direction and the second hole 35 on the outer circumferential surface of the cylindrical member 3a less likely to interfere with each other when the valve body 3 moves in the axial direction, and thus the valve body 3 can move smoothly in the axial direction. A direction in which the second hole 35 extends is the radial direction. A direction in which the second hole 35 extends is a direction orthogonal to the axial direction. Since the second hole 35 is orthogonal to the axial direction, the cylindrical member 3*a* can be more easily processed in comparison to other cases. The second supported part 32 has, on an outer circumference thereof, a second contact part 33 having an end on an outer side in the radial direction that comes in contact with the second support part 22 and the second hole 35 serving as a second separation part having an end on an outer side in the radial direction which is away from the second support part 22.

A cross-sectional shape of the third hole 34 is a circular shape. Since the cross-section of the third hole 34 has a circular shape, the cylindrical member 3*a* can be more easily processed in comparison to other cases. In addition, since the third hole 34 has a circular shape on the outer circumferential surface of the cylindrical member 3*a*, it is possible to make the end of the second step surface 22*a* on an inner side in the radial direction and the third hole 34 on the outer circumferential surface of the cylindrical member 3*a* less likely to interfere with each other when the valve body 3 moves in the axial direction, and thus the valve body 3 can move smoothly in the axial direction. A direction in which the third hole 34 extends is the radial direction. A direction in which the third hole 34 extends is a direction orthogonal to the axial direction. Since the third hole 34 is orthogonal to the axial direction, the cylindrical member 3*a* can be more easily processed in comparison to other cases. The second supported part 32 has, on an outer circumference thereof, the third hole 34 serving as a second separation part having an end on an outer side in the radial direction away from the second support part 22. A position of the third hole 34 in the circumferential direction is the same as a position of the second hole 35 in the circumferential direction on the outer circumferential surface of the cylindrical member 3*a*. A position of the third hole 34 in the circumferential direction may be different from a position of the second hole 35 in the circumferential direction on the outer circumferential surface of the cylindrical member 3*a*.

<Flange Member 6>

Figure 4:
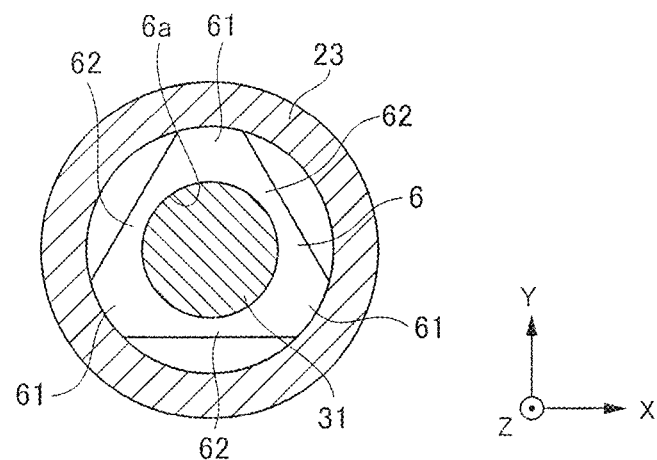
FIG. 4 is diagram illustrating an A-A' cross-section of FIG. 3.

FIG. 4 is a diagram illustrating an A-A' cross-section of FIG. 3. The flange member 6 is a plate-shaped member in which first contact parts 61 each having the outer end in the radial direction that come in contact with the first support part 23 and first separation parts 62 each having an outer end in the radial direction away from the first support part 23 are disposed alternately in the circumferential direction. In the present example embodiment, the flange member 6 has three first contact parts 61 and three first separation parts 62 disposed in the circumferential direction. The outer ends of the first contact parts 61 in the radial direction are positioned further outward in the radial direction than the outer end of the valve body part 31 in the radial direction. The flange member 6 has a through hole 6*a* penetrating therethrough in the axial direction. Since the valve body part 31 is press-fitted into the through hole 6*a*, the flange member 6 is fixed to the cylindrical member 3*a*. According to the present example embodiment, since a size of a flow path formed between the first contact parts 61 and the first separation parts 62 is uniform regardless of a position of the valve body 3 in the axial direction, a flow rate of refluxing blowby gas can be ensured. According to the present example embodiment, by supporting the valve body 3 at three points in the first support part 23 (contacts of the three first contact parts 61 and the first support part 23), stable support can be obtained, and a flow rate of refluxing blowby gas can be ensured.

Figure 5:
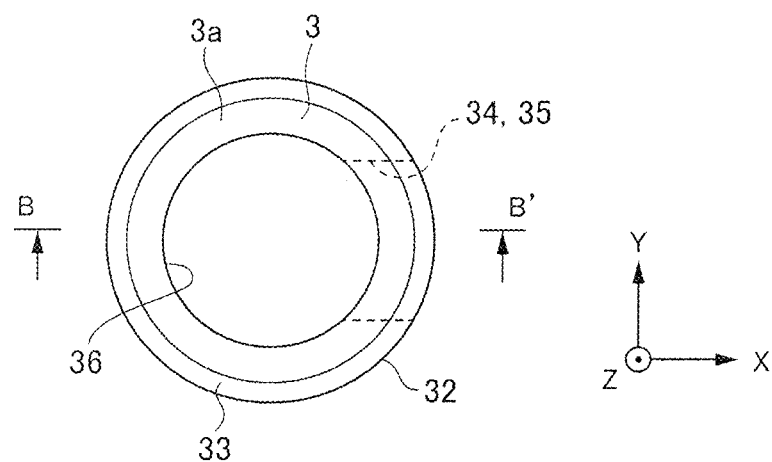
FIG. 5 is a side diagram of a valve body 3 of FIG. 3 viewed from the other side in an axial direction.
Figure 6:
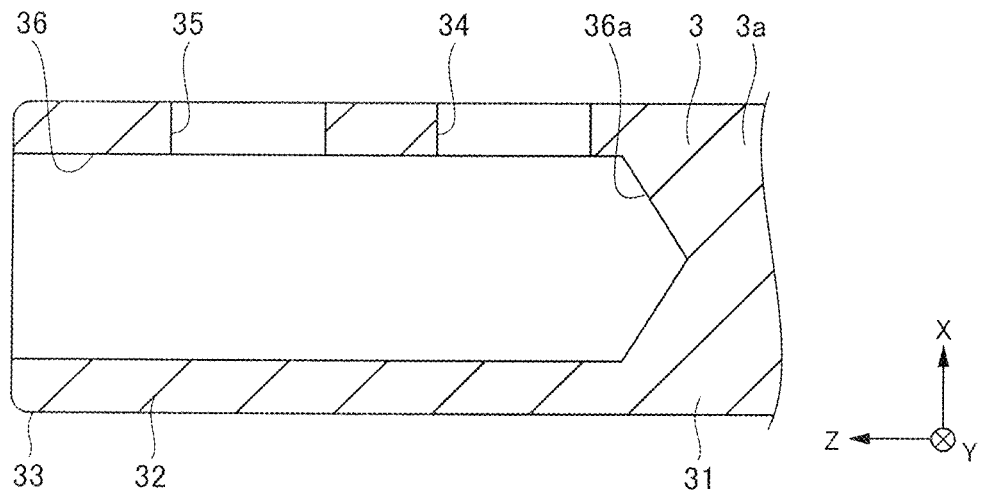
FIG. 6 is a diagram illustrating a B-B' cross-section of FIG. 5.

FIG. 5 is a side diagram of the valve body 3 of FIG. 3 viewed from the other side in the axial direction. FIG. 6 is a diagram of a B-B' cross-section of FIG. 5. The second hole 35 extends from an outer circumferential surface of the second supported part 32 toward the first hole 36 in the radial direction. The second hole 35 is open toward the first hole 36. The third hole 34 extends from the outer circumferential surface of the second supported part 32 toward the first hole 36 in the radial direction. The third hole 34 is open toward the first hole 36. A diameter of the first hole 36, a diameter of the second hole 35, and a diameter of the third hole 34 may be determined according to a flow rate of blowby gas. A diameter of the first hole 36 is greater than a diameter of the second hole 35. A diameter of the first hole 36 may be the same as a diameter of the second hole 35. A diameter of the first hole 36 may be smaller than a diameter of the second hole 35. A diameter of the first hole 36 may be greater than a diameter of the third hole 34. A diameter of the first hole 36 may be the same as a diameter of the third hole 34. A diameter of the first hole 36 may be smaller than a diameter of the third hole 34. A diameter of the second hole 35 is the same as a diameter of the third hole 34. A diameter of the second hole 35 may be smaller than a diameter of the third hole 34. A diameter of the second hole 35 may be greater than a diameter of the third hole 34.

<Operation of PCV Valve 116>

In a case where a force to move the valve body 3 to the other side in the axial direction due to negative pressure applied to the second opening 25 side relative to the first opening 71 side is weaker than a biasing force of the biasing member 4, the flange member 6 comes in contact with the valve seat member 7 and plugs the first opening 71, and thereby the PCV valve 116 closes. In a case where a force to move the valve body 3 to the other side in the axial direction due to negative pressure applied to the second opening 25 side relative to the first opening 71 side is greater than a biasing force of the biasing member 4, the flange member 6 is separated from the valve seat member 7 and thus opens the first opening 71, and thereby the PCV valve 116 opens. At this time, a flow path for blowby gas is formed by the first opening 71, the space between the first support part 23 and the first separation parts 62, the space between the tube body part 24 and the valve body part 31, the second hole 35, the third hole 34, the first hole 36, and the second opening 25.

According to the present example embodiment, since the flow path is formed by the second hole 35, the third hole 34, and the first hole 36, a reflux valve that can cause a large amount of blowby gas to actively reflux in a situation in which negative pressure on the entrance side is small can be provided without increasing a size of the reflux valve.

Figure 7:
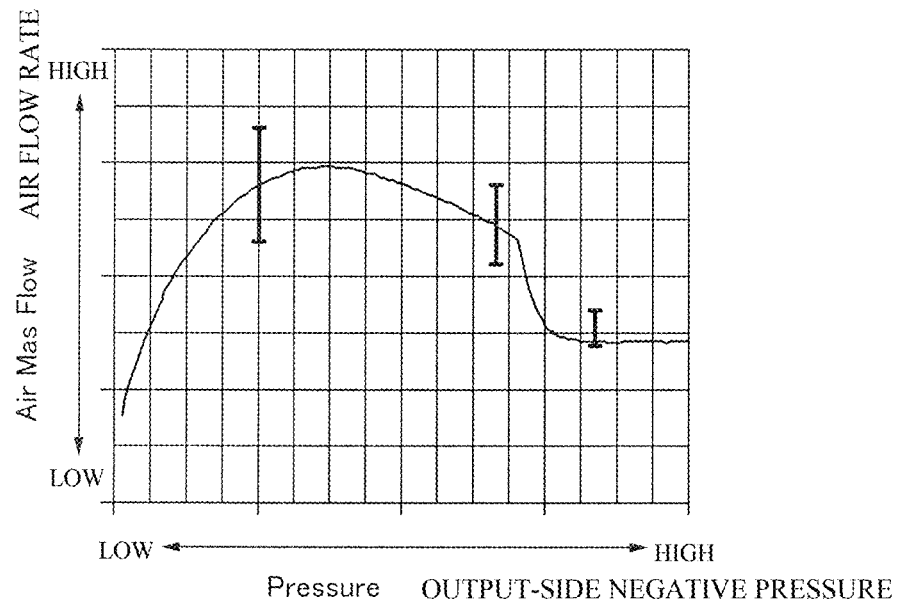
FIG. 7 is a diagram showing operation characteristics of a PCV valve of the related art.
Figure 8:
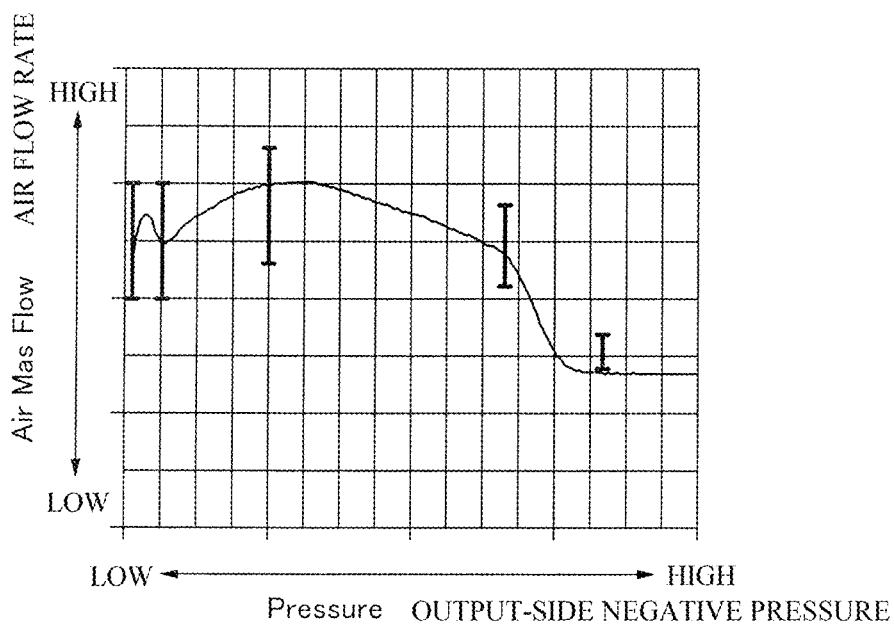
FIG. 8 is a diagram showing operation characteristics of a PCV valve 116 according to an example embodiment of the present disclosure.

FIG. 7 is a diagram showing operation characteristics of a PCV valve of the related art. FIG. 8 is a diagram showing operation characteristics of the PCV valve 116 according to the present example embodiment. In FIG. 7 and FIG. 8, the horizontal axis represents negative pressure on the intake side (the entrance side of blowby gas that has passed through the PCV valve and is introduced into the combustion chamber) (output-side negative pressure), and the vertical axis represents a flow rate of blowby gas flowing via the PCV valve. In the PCV valve of the related art illustrated in FIG. 7, in the case of a region on the intake side with low negative pressure, for example, a flow rate of blowby gas is not sufficiently ensured. On the other hand, in the PCV valve 116 of the present example embodiment, even in the case of a region on the intake side with low negative pressure, for example, a flow rate of the blowby gas can be sufficiently ensured as illustrated in FIG. 8. Therefore, according to the PCV valve 116 of the present example embodiment, reflux of blowby gas is promoted even in, for example, a low rotation range of the internal combustion engine 100.

Second Example Embodiment

Since an internal combustion engine of a second embodiment of the present disclosure has the same configuration as that of the first example embodiment, description of the overall configurations including the internal combustion engine will be omitted.

<PCV Valve 116>

A PCV valve 116 according to the second example embodiment of the present disclosure will be described below. A difference of the present example embodiment from the first example embodiment is holes extending from an outer circumferential surface of the cylindrical member 3a and reaching the first hole 36, but other matters are similar to those of the first example embodiment, and therefore, detailed description thereof will be omitted.

<Cylindrical Member 3a>

Figure 9:
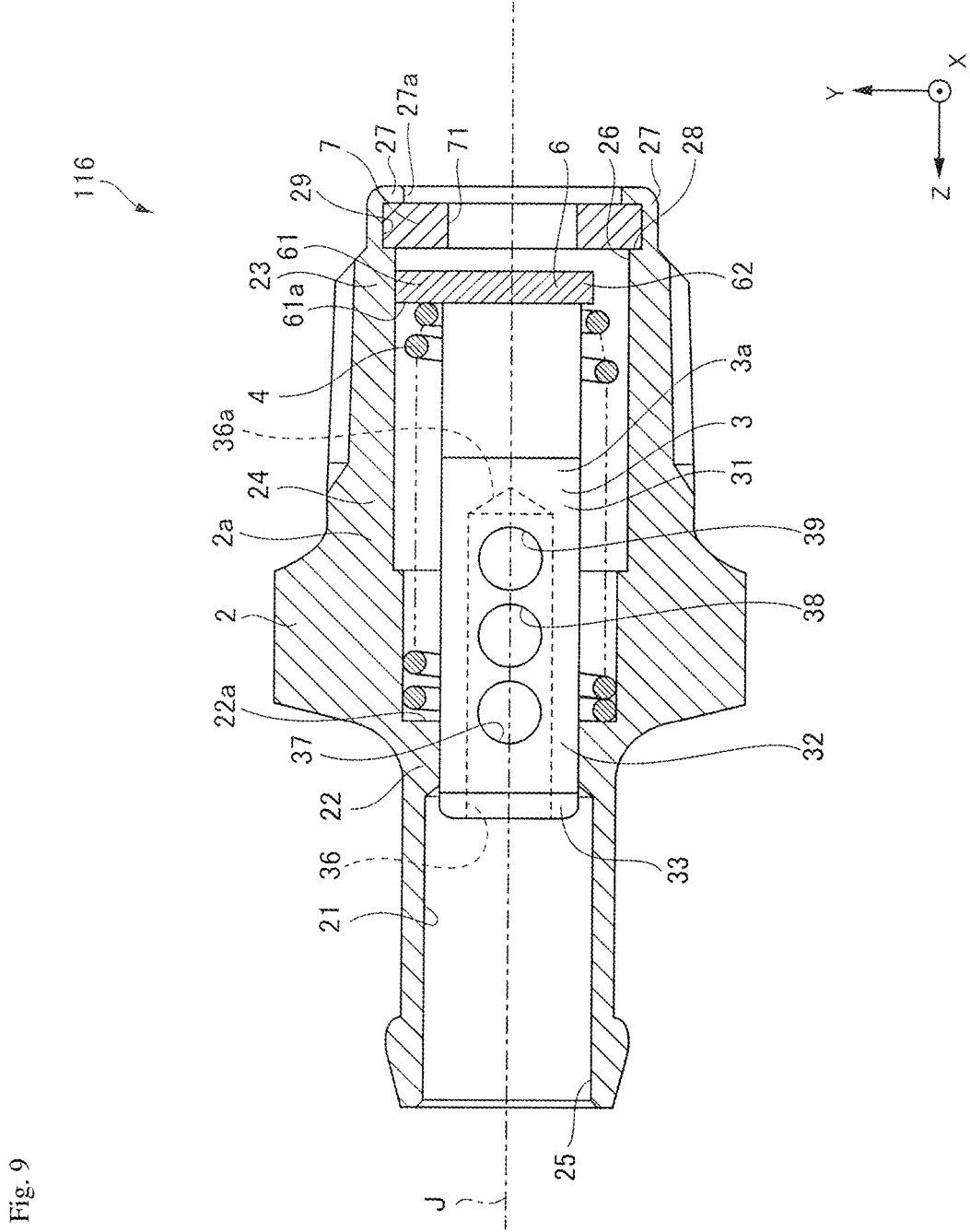
FIG. 9 is a side sectional diagram of a PCV valve 116 according to a second example embodiment of the present disclosure.

FIG. 9 is a side sectional diagram of the PCV valve 116 according to the second example embodiment of the present disclosure. FIG. 9 is a diagram illustrating a state in which the PCV valve 116 is open. In the present example embodiment, a second hole 37, a third hole 38, and another third hole 39 are provided. Each of the second hole 37, the third hole 38, and the third hole 39 extends from an outer circumferential surface of the cylindrical member 3a toward a first hole 36 in the radial direction. Each of the second hole 37, the third hole 38, and the third hole 39 is open to the first hole 36. Diameters of the second hole 37, the third hole 38, and the third hole 39 may be determined according to a flow rate of blowby gas.

Figure 10:
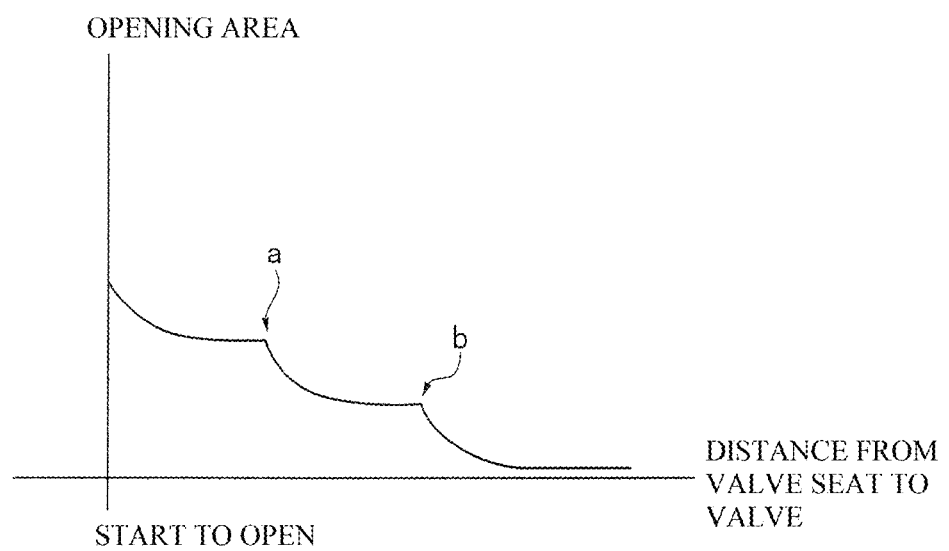
FIG. 10 is a graph showing an example of a relationship between a position of the valve body 3 in an axial direction and an opening area of the PCV valve 116 in the second example embodiment of the present disclosure.

FIG. 10 is a graph showing an example of a relationship between an axial position of a valve body 3 and an opening area of the PCV valve 116 in the second example embodiment. In FIG. 10, the horizontal axis represents distance from a valve seat member 7 serving as a valve seat to the valve body 3 serving as a valve, and the vertical axis represents opening area formed by the second hole 37, the third hole 38, and the third hole 39 on the flow path for blowby gas. Since the flange member 6 starts moving to the other side in the axial direction when the PCV valve 116 starts to open, the flange member 6 is separated from the valve seat member 7. At this time, all of the second hole 37, the third hole 38, and the third hole 39 are positioned on one side of the second step surface 22a of the second support part 22 in the axial direction, and all of the second hole 37, the third hole 38, and the third hole 39 are open on the flow path for blowby gas. For this reason, the sum of sectional areas of the second hole 37, the third hole 38, and the third hole 39 is equal to the opening area, and the opening area has a maximum value. As the valve seat member 7 moves to the other side in the axial direction, the second hole 37 moves to the other side of the second step surface 22a in the axial direction, and thus only the third hole 38 and the third hole 39 are open on the flow path for blowby gas (the inflection point a in the graph of FIG. 10). As the valve seat member 7 further moves to the other side in the axial direction, the third hole 38 moves to the other side of the second step surface 22a in the axial direction, and thus only the third hole 39 is open on the flow path for blowby gas (the inflection point b in the graph of FIG. 10). Then, when the valve seat member 7 further moves to the other side in the axial direction, the third hole 39 also moves to the other side of the second step surface 22a in the axial direction, and the opening area on the flow path for blowby gas has a minimum value. According to the present example embodiment, an opening area can be adjusted as illustrated in FIG. 10, and a flow rate of blowby gas can be adjusted accordingly.

Third Example Embodiment

Since a configuration of an internal combustion engine of a third example embodiment of the present disclosure is the same as that of the first example embodiment, description of the overall configurations including the aforementioned internal combustion engine will be omitted.

<PCV Valve 116>

A PCV valve 116 according to the third example embodiment of the present disclosure will be described below. A difference of the present example embodiment from the first example embodiment is holes extending from an outer circumferential surface of the cylindrical member 3a and reaching the first hole 36, but other matters are similar to those of the first example embodiment, and therefore, detailed description thereof will be omitted.

<Cylindrical Member 3a>

Figure 11:
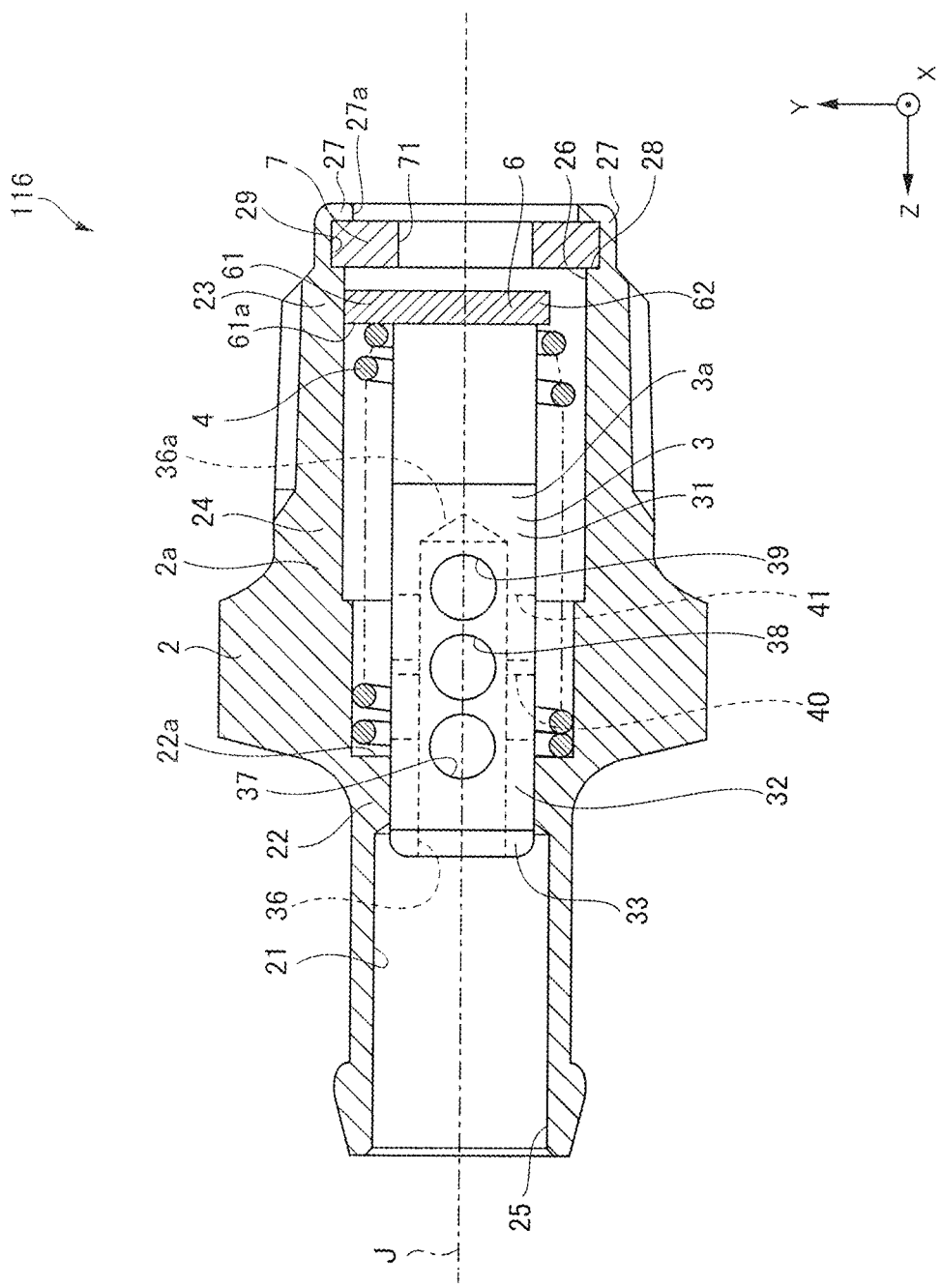
FIG. 11 is a side sectional diagram of a PCV valve 116 according to a third example embodiment of the present disclosure.
Figure 12:
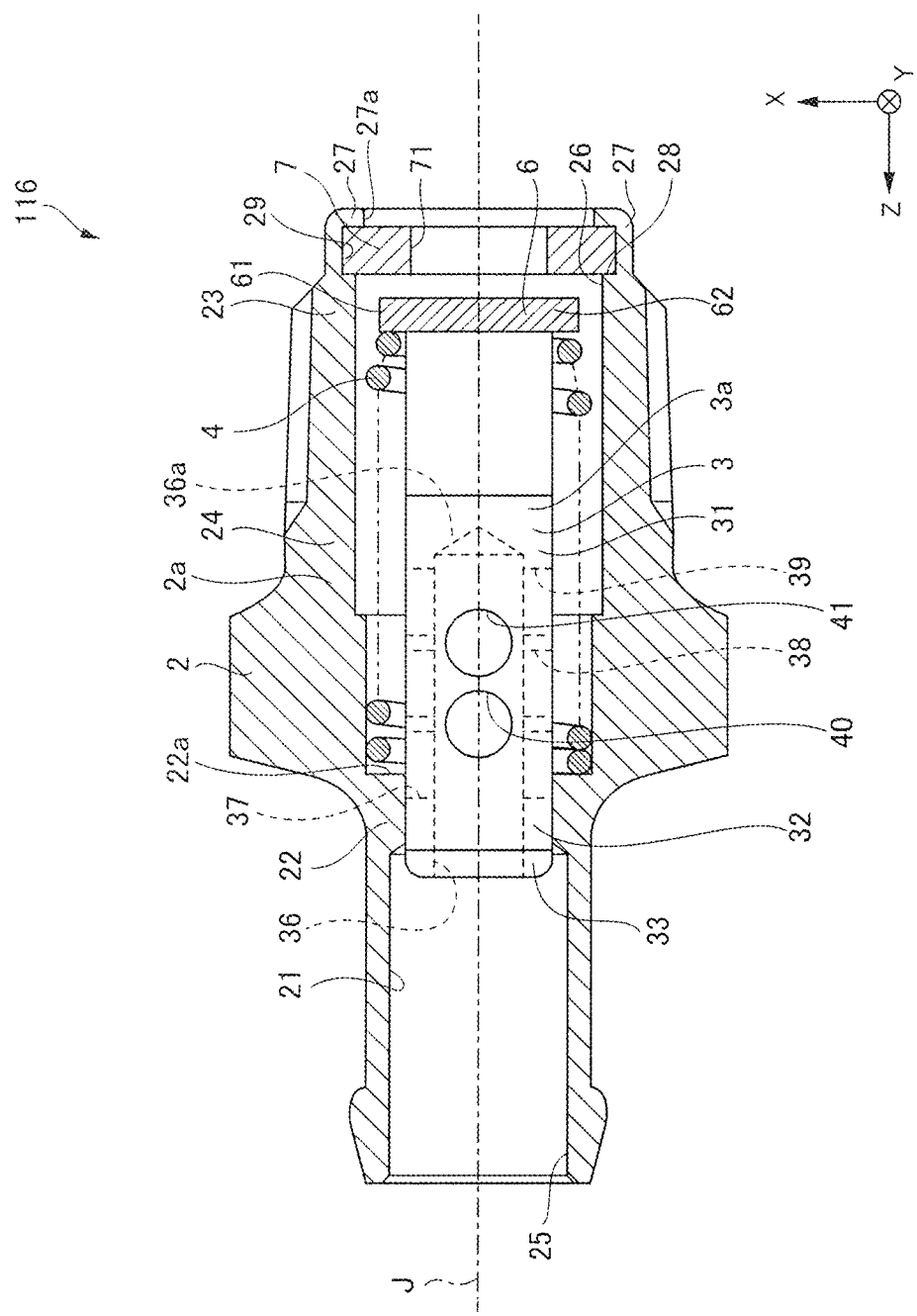
FIG. 12 is a side sectional diagram of the PCV valve 116 according to the third example embodiment of the present disclosure.

FIG. 11 is a side sectional diagram of the PCV valve 116 according to the third example embodiment of the present disclosure. FIG. 11 illustrates a state in which the PCV valve 116 is open. FIG. 11 illustrates the PCV valve 116 viewed from the +X side. FIG. 12 is a side sectional diagram of the PCV valve 116 according to the third example embodiment of the present disclosure. FIG. 12 illustrates a state in which the PCV valve 116 is open. FIG. 12 illustrates the PCV valve 116 viewed from the −Y side by differing the viewing direction from that in FIG. 11. In the present example embodiment, a second hole 37, a third hole 38, a third hole 39, a third hole 40, and a third hole 41 are provided. Each of the second hole 37, the third hole 38, the third hole 39, the third hole 40, and the third hole 41 extends from an outer circumferential surface of a cylindrical member 3a toward a first hole 36 in the radial direction. Each of the second hole 37, the third hole 38, the third hole 39, the third hole 40, and the third hole 41 is open to the first hole 36. Diameters of the second hole 37, the third hole 38, the third hole 39, the third hole 40, and the third hole 41 may be determined according to a flow rate of blowby gas.

Each of the second hole 37, the third hole 38, the third hole 39, the third hole 40, and the third hole 41 penetrates the cylindrical member 3a in the radial direction. Each of the second hole 37, the third hole 38, the third hole 39, the third hole 40, and the third hole 41 penetrates a valve body part 31 in the radial direction. Since the second hole 37 penetrates the valve body part 31 according to the present example embodiment, manufacturing processing of the valve can be more simplified than in a case where the second hole 37 stops in the middle of the valve body part 31. Since the third hole 38, the third hole 39, the third hole 40, and the third hole 41 penetrate the valve body part 31 according to the present example embodiment, manufacturing processing of the valve can be more simplified than in a case where the third hole 38, the third hole 39, the third hole 40, and the third hole 41 stop in the middle of the valve body part 31.

The third hole 38, the third hole 39, the third hole 40, and the third hole 41 are a plurality of holes located at different positions in the axial direction and in the circumferential direction. According to the present example embodiment, since a plurality of the third hole 38, the third hole 39, the third hole 40, and the third hole 41 are provided in the circumferential direction, an opening area can be secured and a flow rate of refluxing blowby gas can be ensured in comparison to a case where a single hole is provided. According to the present example embodiment, since a plurality of the third hole 38, the third hole 39, the third hole 40, and the third hole 41 are provided in the axial direction, an opening area can be finely adjusted and a flow rate of refluxing blowby gas can be finely adjusted in comparison to the case where a single hole is provided.

Among the plurality of the third hole 38, the third hole 39, the third hole 40, and the third hole 41, positions of a first hole group whose position in the circumferential direction is a first position (the third hole 38 and the third hole 39) and a second hole group whose position in the circumferential direction is a second position (the third hole 40 and the third hole 41) deviate in the axial direction. According to the present example embodiment, since the positions of the first hole group and the second hole group deviate in the axial direction, a flow rate of refluxing blowby gas can be finely adjusted according to a position of a valve body 3 in the axial direction. The direction in which the first hole group extends is orthogonal to the direction in which the second hole group extends. According to the present example embodiment, since the direction in which the first hole group extends is orthogonal to the direction in which the second hole group extends, the cylindrical member 3a can be easily processed in comparison to other cases.

A direction in which each of the third hole 38, the third hole 39, the third hole 40, and the third hole 41 extends is a direction orthogonal to the axial direction. According to the present example embodiment, since each of the third hole 38, the third hole 39, the third hole 40, and the third hole 41 is orthogonal to the axial direction, the cylindrical member 3a can be easily processed in comparison to other cases.

A cross-sectional shape of each of the third hole 38, the third hole 39, the third hole 40, and the third hole 41 is a circular shape. Since each of the third hole 38, the third hole 39, the third hole 40, and the third hole 41 has a circular-shaped cross-section, the cylindrical member 3a can be easily processed in comparison to other cases. In addition, since the third hole 38, the third hole 39, the third hole 40, and the third hole 41 have a circular shape on an outer circumferential surface of the cylindrical member 3a, when the valve body 3 moves in the axial direction, it is possible to make the end of a second step surface 22a on an inner side in the radial direction and the third hole 38, the third hole 39, the third hole 40, and the third hole 41 on the outer circumferential surface the cylindrical member 3a less likely to interfere with each other, and therefore the valve body 3 can move smoothly in the axial direction.

Figure 13:
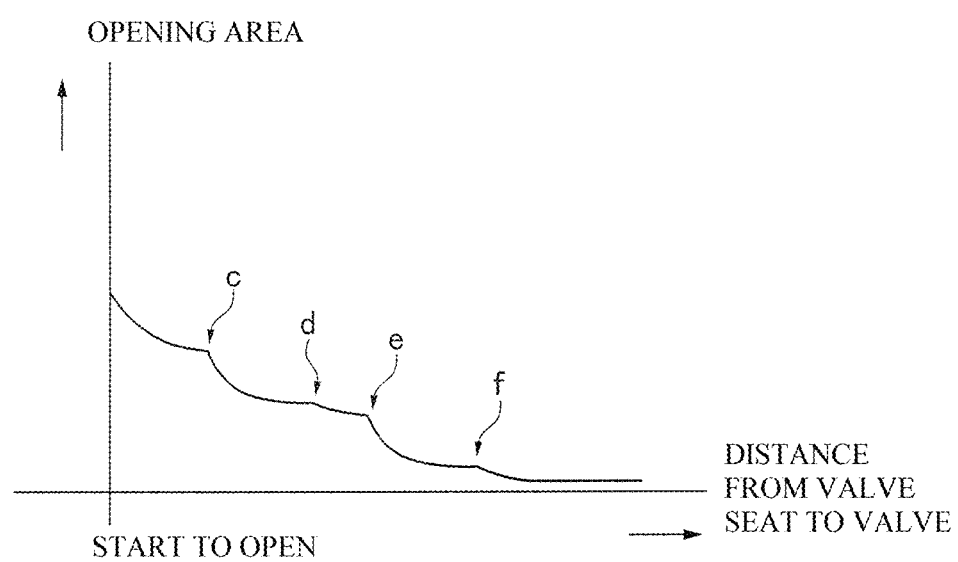
FIG. 13 is a graph showing an example of a relationship between a position of a valve body 3 in an axial direction and an opening area of the PCV valve 116 in the third example embodiment of the present disclosure.

FIG. 13 is a graph showing an example of a relationship between a position of the valve body 3 in the axial direction and an opening area of the PCV valve 116 in the third example embodiment. In FIG. 13, the horizontal axis represents distance from the valve seat member 7 serving as a valve seat to the valve body 3 serving as a valve, and the vertical axis represents opening area formed by the second hole 37, the third hole 38, the third hole 39, the third hole 40, and the third hole 41 on the flow path for blowby gas. When the PCV valve 116 starts to open, the flange member 6 starts to move to the other side in the axial direction, and thus the flange member 6 is separated from the valve seat member 7. At this time, all of the second hole 37, the third hole 38, the third hole 39, the third hole 40, and the third hole 41 are positioned on one side of the second step surface 22a of a second support part 22 in the axial direction, and all of the second hole 37, the third hole 38, the third hole 39, the third hole 40, and the third hole 41 are open on the flow path for blowby gas. For this reason, the sum of sectional areas of the second hole 37, the third hole 38, the third hole 39, the third hole 40, and the third hole 41 is equal to the opening area, and the opening area has a maximum value. As the valve seat member 7 moves to the other side in the axial direction, the second hole 37 moves to the other side of the second step surface 22a in the axial direction, and thus the third hole 40 moves to the other side of the second step surface 22a in the axial direction (the inflection point c in the graph of FIG. 13). As the valve seat member 7 further moves to the other side in the axial direction, the third hole 38 moves to the other side of the second step surface 22a in the axial direction (the inflection point d in the graph of FIG. 13). As the valve seat member 7 further moves to the other side in the axial direction, the third hole 41 moves to the other side of the second step surface 22a in the axial direction (the inflection point e in the graph of FIG. 13). As the valve seat member 7 further moves to the other side in the axial direction, the third hole 39 moves to the other side of the second step surface 22a in the axial direction (the inflection point f in the graph of FIG. 13). According to the present example embodiment, an opening area can be adjusted as shown in FIG. 13, and accordingly a flow rate of blowby gas can be finely adjusted.

An application of the PCV valve of the above-described example embodiments is not particularly limited. The PCV valve of the above-described example embodiments can be mounted in, for example, a vehicle. In addition, each of configurations of the above-described example embodiments can be appropriately combined within a scope in which the configurations do not contradict.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A reflux valve that is disposed on a blowby gas passage for refluxing blowby gas of an internal combustion engine to an intake side, the reflux valve comprising:
    a housing including a tube including a through hole penetrating the tube in a direction parallel or substantially parallel to a central axis;
    a valve body that is movable inside the through hole in an axial direction; and
    a biasing member that biases the valve body to one side in the axial direction; wherein
    the tube includes a first opening that is open to one side of the through hole in the axial direction and connected to the blowby gas passage on an upstream side, a second opening that is open to the other side of the through hole in the axial direction and connected to the blowby gas passage on a downstream side, a first support portion that supports the valve body on one side of the through hole in the axial direction, a second support portion that supports the valve body on the other side of the through hole in the axial direction, and a tube body portion that is provided on the other side of the first support portion in the axial direction and one side of the second support portion in the axial direction;

the valve body includes a first supported portion that is supported by the first support portion, a second supported portion that is supported by the second support portion, and a valve body portion that is provided on the other side of the first supported portion in the axial direction and one side of the second supported portion in the axial direction;

the first supported portion plugs the first opening when the valve body biased by the biasing member moves to one side in the axial direction;

the first supported portion opens the first opening when the valve body moves to the other side in the axial direction against a biasing force of the biasing member due to negative pressure applied to the downstream side relative to the upstream side;

the valve body includes a first hole extending from an end on the other side in the axial direction to one side in the axial direction;

the valve body portion includes a second hole extending from an outer side in a radial direction and reaching the first hole; and the valve body portion includes a third hole at a different position from the second hole in the axial direction.

2. The reflux valve according to claim 1, wherein at least the second hole penetrates the valve body portion in the radial direction.

3. The reflux valve according to claim 2, wherein the third hole includes a plurality of holes located at different positions in the axial direction and in a circumferential direction.

4. The reflux valve according to claim 3, wherein, among a plurality of third holes, positions of a first hole group whose position in the circumferential direction is a first position and a second hole group whose position in the circumferential direction is a second position deviate in the axial direction.

5. The reflux valve according to claim 2, wherein a direction in which the third hole extends is a direction perpendicular or substantially perpendicular to the axial direction.

6. The reflux valve according to claim 2, wherein a direction in which the first hole extends is a direction parallel or substantially parallel to the axial direction.

7. The reflux valve according to claim 2, wherein a cross-sectional shape of the third hole is a circular or substantially circular shape.

8. The reflux valve according to claim 1, wherein the second hole and the third hole penetrate the valve body portion in the radial direction.

9. The reflux valve according to claim 8, wherein the third hole includes a plurality of holes located at different positions in the axial direction and in a circumferential direction.

10. The reflux valve according to claim 9, wherein, among a plurality of third holes, positions of a first hole group whose position in the circumferential direction is a first position and a second hole group whose position in the circumferential direction is a second position deviate in the axial direction.

11. The reflux valve according to claim 8, wherein a direction in which the third hole extends is a direction perpendicular or substantially perpendicular to the axial direction.

12. The reflux valve according to claim 8, wherein a direction in which the first hole extends is a direction parallel or substantially parallel to the axial direction.

13. The reflux valve according to claim 8, wherein a cross-sectional shape of the third hole is a circular or substantially circular shape.

14. The reflux valve according to claim 1, wherein the third hole includes a plurality of holes located at different positions in the axial direction and in a circumferential direction.

15. The reflux valve according to claim 14, wherein, among a plurality of third holes, positions of a first hole group whose position in the circumferential direction is a first position and a second hole group whose position in the circumferential direction is a second position deviate in the axial direction.

16. The reflux valve according to claim 15, wherein a direction in which the first hole group of the third hole extends is perpendicular or substantially perpendicular to a direction in which the second hole group extends.

17. The reflux valve according to claim 1, wherein a direction in which the third hole extends is a direction perpendicular or substantially perpendicular to the axial direction.

18. The reflux valve according to claim 1, wherein a direction in which the first hole extends is a direction parallel or substantially parallel to the axial direction.

19. The reflux valve according to claim 1, wherein a cross-sectional shape of the third hole is a circular or substantially circular shape.

* * * * *